US009171163B2

United States Patent
Phegade et al.

(10) Patent No.: US 9,171,163 B2
(45) Date of Patent: Oct. 27, 2015

(54) MUTUALLY ASSURED DATA SHARING BETWEEN DISTRUSTING PARTIES IN A NETWORK ENVIRONMENT

(71) Applicant: Intel Corporation, Santa Clara, CA (US)

(72) Inventors: Vinay Phegade, Beaverton, OR (US); Anand Rajan, Beaverton, OR (US); Simon Johnson, Beaverton, OR (US); Vincent Scarlata, Beaverton, OR (US); Carlos Rozas, Portland, OR (US); Nikhil Deshpande, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 179 days.

(21) Appl. No.: 13/844,101

(22) Filed: Mar. 15, 2013

(65) Prior Publication Data

US 2014/0283098 A1    Sep. 18, 2014

(51) Int. Cl.
*G06F 21/60* (2013.01)
*G06F 21/57* (2013.01)
*G06F 21/64* (2013.01)

(52) U.S. Cl.
CPC .............. *G06F 21/57* (2013.01); *G06F 21/60* (2013.01); *G06F 21/64* (2013.01); *G06F 2221/2105* (2013.01)

(58) Field of Classification Search
CPC .................. G06F 21/57; G06F 21/62–21/629
See application file for complete search history.

(56) References Cited

U.S. PATENT DOCUMENTS

| 8,307,208 | B2* | 11/2012 | Matsuo ......................... 713/171 |
| 2003/0041255 | A1* | 2/2003 | Chen et al. .................... 713/193 |
| 2003/0215114 | A1* | 11/2003 | Kyle .............................. 382/115 |
| 2004/0102991 | A1* | 5/2004 | Casey et al. ........................ 705/1 |
| 2004/0239549 | A1* | 12/2004 | Morgan et al. ............... 342/25 R |
| 2004/0259640 | A1* | 12/2004 | Gentles et al. .................. 463/42 |
| 2006/0195689 | A1 | 8/2006 | Blecken et al. |
| 2008/0141030 | A1 | 6/2008 | Patrick |
| 2009/0123034 | A1* | 5/2009 | Bolle et al. .................... 382/115 |
| 2009/0276416 | A1* | 11/2009 | Ball et al. .......................... 707/5 |
| 2011/0296201 | A1 | 12/2011 | Monclus et al. |

(Continued)

FOREIGN PATENT DOCUMENTS

WO    WO 2014/151038    9/2014

OTHER PUBLICATIONS

PCT International Search Report and Written Opinion in PCT International Application Serial No. PCT/US2014/024811 mailed on Jul. 3, 2014.

(Continued)

*Primary Examiner* — Matthew Henning
(74) *Attorney, Agent, or Firm* — Patent Capital Group

(57) ABSTRACT

An apparatus for sharing information between entities includes a processor and a trusted execution module executing on the processor. The trusted execution module is configured to receive first confidential information from a first client device associated with a first entity, seal the first confidential information within a trusted execution environment, receive second confidential information from a second client device associated with a second entity, seal the second confidential information within the trusted execution environment, and execute code within the trusted execution environment. The code is configured to compute a confidential result based upon the first confidential information and the second confidential information.

22 Claims, 6 Drawing Sheets

(56) References Cited

U.S. PATENT DOCUMENTS

2012/0331550 A1 12/2012 Raj et al.
2013/0013928 A1 1/2013 Thom et al.

OTHER PUBLICATIONS

PCT International Preliminary Report on Patentability in PCT International Application Serial No. PCT/US2014/024811 mailed on Sep. 15, 2015.

* cited by examiner

MUTUALLY ASSURED DATA SHARING BETWEEN DISTRUSTING PARTIES IN A NETWORK ENVIRONMENT

TECHNICAL FIELD

This disclosure relates in general to the field of data sharing, and more particularly, to mutually assured data sharing between distrusting parties in a network environment.

BACKGROUND

The field of data sharing has become increasingly important. Mutually distrusting entities often have a necessity or desire to share sensitive information with one another. However, they are often reluctant to do so due to the risk of information leakage. For example, the Department of Homeland Security (DHS) and an airline may need to share sensitive data to prevent a suspected terrorist from boarding an airplane. The DHS maintains a terrorist suspect watch list database and wants to verify that a person matching a description in that database is apprehended before the flight takes off. The airline has a passenger manifest of all passengers scheduled to board flight. The passenger manifest may include a suspected terrorist as well as other people not on the terrorist suspect watch list. However, because of the sensitivity of data in the DHS database, the DHS may not want to disclose the sensitive data to the airline. For example, if the watch list is leaked, a terrorist could be alerted which may jeopardize some aspect of national security. For privacy reasons, the airline may not want to provide information regarding all of the passengers on a particular flight to the DHS. If the passenger manifest is leaked and misused, the airline may violate privacy regulations with respect to the passengers private information. Significant challenges remain for sharing of sensitive information between distrusting entities while ensuring that the shared information will only be used for an agreed upon purpose by the entities.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EMBODIMENTS

Figure 1:
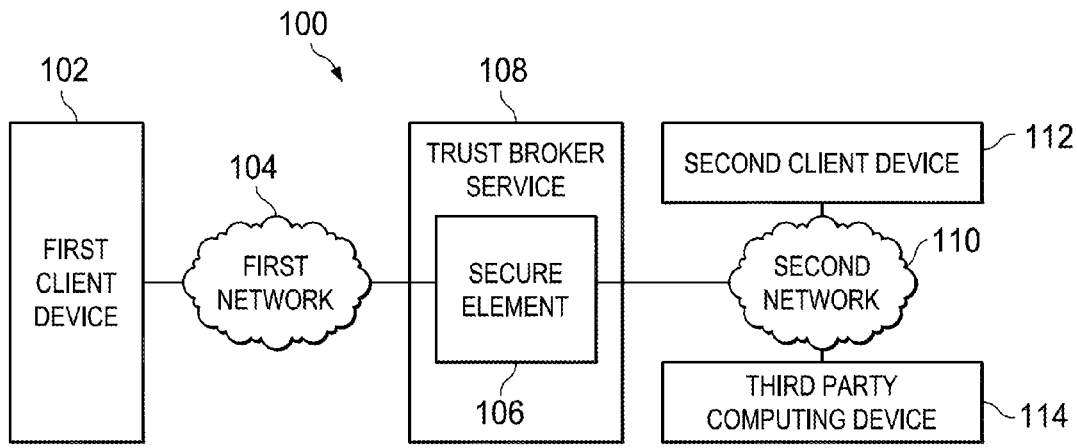
FIG. 1 is a simplified block diagram of a communication system for mutually assured data sharing between distrusting parties in a network environment in accordance with an embodiment of the present disclosure.

FIG. 1 is a simplified block diagram of a communication system 100 for mutually assured data sharing between distrusting parties in a network environment in accordance with an embodiment of the present disclosure. Communication system 100 includes a first client device 102 in communication with a first network 104. First network 104 is in further communication with a secure element 106 of a trust broker service 108. Secure element 106 is in further communication with a second network 110. Second network 110 is in further communication with a second client device 112. In particular embodiments, communication system 100 may further include a third party computing device 114 in communication with second network 110.

Elements of FIG. 1 may be coupled to one another through one or more interfaces employing any suitable connections (wired or wireless), which provide viable pathways for network communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

In some embodiments, communication system 100 enable distrusting entities to share their respective data using one or more mutually agreed upon procedure and/or algorithms that determine the portions of their respective data will be shared within a trusted execution environment provided by a trusted broker. In one or more embodiments, first client device 102 may be associated with a first entity and second client device 112 may be associated with a second entity. The first entity and second entity may desire to share information with one another using secure element 106 provided by trust broker service 108 as will be further described herein. In particular embodiments, the first entity and the second entity may not trust each other with their respective confidential data. In addition, the first entity and the second entity may not trust an entity and its computing infrastructure, such trust broker service 108, with their data without having the capabilities of secure element 106.

In various embodiments, first network 104 and second network 110 facilitate communication among network elements within communication network 100 such as first client device 102, secure element 106, second client device 112, and third party computing device 114. In accordance with various embodiments, secure element 106 is configured to receive sensitive data from each of first client device 102 and second client device 112, process the data within a trusted execution environment using one or more mutually agreed upon procedures and/or algorithms, and provide a portion of the processed data to one or more of first client device 102, second client device 112, or third party computing device 114. In one or more embodiments, the trusted execution environment provided by secure element 106 protects and/or resists disclosure of confidential information received from the first entity and the second entity during storage and algorithm execution from adversaries such as those capable of launching attacks via malicious software and/or hardware means. In one or more embodiments, secure element 106 may be a hardware, software, and/or network element. In still other embodiments, the trusted execution environment may be provided by a single machine having one or more secure elements 106 or a group of distributed secure elements 106 acting in unison.

For purposes of illustrating certain example techniques of communication system 100, it is important to understand the communications that may be traversing the network environment. The following foundational information may be viewed as a basis from which the present disclosure may be properly explained.

Mutually distrusting entities often have a necessity or desire for sharing sensitive information with one another. However, they are often reluctant to do so due to the risk of information leakage. For example, the Department of Homeland Security (DHS) and an airline may need to share sensitive data to prevent a suspected terrorist from boarding an airplane. The DHS may maintain a terrorist suspect watch list database and wants to verify that a person matching a description in that database is caught before the flight takes off. The airline may collect a passenger manifest of all passengers scheduled to board flight. The passenger manifest may include a suspected terrorist as well as other people not on the terrorist suspect watch list. Because of the sensitivity of data in the DHS database, the DHS may not want to disclose the sensitive data to the airline. For example, if the watch list is leaked, a terrorist could be alerted which may compromise national security. Similarly, for privacy reasons, the airline may not want to provide information regarding all of the passengers on a particular flight to the DHS.

Existing solutions do not efficiently address a number of issues that may arise. First, existing solutions may not provide an assurance that each parties respective data will only be used for the intended purpose. For example, in the DHS airline example described above existing solutions may not give assurance that the terrorist watch list provided by the DHS and the passenger manifest provided by the airline will be used only for the purpose of identifying terrorists without leaking sensitive data to each other or to outside entities. Second, existing solutions may not provide for the ability to scale dynamically as additional data is included in a particular processing algorithm such as facial recognition or fingerprints for a "terrorist identification" algorithm. Third, existing solutions may not provide the ability to produce a result, such as identifying potential terrorists, in a cost-effective and timely fashion.

A communication system 100 for mutually assured data sharing between distrusting parties in a network environment, as outlined in FIG. 1 can resolve these issues (and others). In communication system 100 of FIG. 1, secure element 106 provides a trusted execution environment to facilitate the sharing of data between the distrusting parties. In various embodiments, the trusted execution environment ensures the secure storage and processing of sensitive data and trusted code or applications, and manages and executes trusted applications while hardware and/or software isolation protects the data and code/applications from other applications or code which may be running in an operating system outside of the trusted execution environment.

In various embodiments, a first party and a second party will provide their respective sensitive data to secure element 106 and secure element 106 may execute the mutually agreed upon procedures and/or algorithms within the trusted execution environment to determine which portions of their respective data will be provided to one or more of the parties. Accordingly, the first party discloses its confidential data to secure element 106 but does not directly disclose its confidential data with the second party. Similarly, the second party discloses its confidential data to secure element 106 but does not directly disclose its confidential data to the first party.

In accordance with various embodiments, the trusted execution environment provided by secure element 106 may have one or more of the following properties: (1) secure element 106 protects the integrity of the code running inside it; (2) secure element 106 protects the confidentiality and integrity of the data provided to it; and (3) each of the parties that provide data to secure element 106 is remotely able to verify that the code they have mutually agreed upon in order to provide a portion of their data to the other party is the code that is running in the trusted execution environment.

In a particular example, DHS is a government agency that may maintain a secret watch list of persons involved in suspect activities such as suspected terrorist activities. DHS wants to identify when someone on the watch list is traveling, but does not want to release this list to the airlines in order to maintain the secrecy of the list. Airlines maintain databases of passengers traveling on different flights but would prefer not to provide all of their customer details to DHS in order to protect the privacy of its customers. In accordance with a particular embodiments, both DHS and the airline mutually agree upon a particular software procedure or algorithm to compare the terrorist watch list provided from DHS to a passenger manifest provided by the airline to determine if one or more persons identified on the terrorist watch list match one or more persons on the passenger manifest. In various embodiment, the software or code executed within the secure element 106 ensures that data of one party is not leaked to the other party.

In accordance with a particular embodiment, the DHS service uses hardware and/or software attestation capabilities of secure element 106 to verify that the trusted execution environment provided by secure element 106 is running its certified code. If the DHS service verifies that the trusted execution environment is running its certified code, the DHS service may establish a secure channel with secure element 106 and send its terrorist watch list to secure element 106. Similarly, the airline service uses hardware and/or software attestation capabilities of secure element 106 to verify that the trusted execution environment provided by secure element 106 is running its certified code. If the airline service verifies that the trusted execution environment is running its certified code, the airline service may establish a secure channel with secure element 106 and send its passenger manifest to secure element 106. Secure element 106 may then perform a comparison of the terrorist watch list and the passenger manifest within the trusted execution environment. If there is a match, depending upon the agreed upon procedure or algorithm, secure element 106 may send a notification to one or more of DHS, the airline, or a third-party such as airport security.

Turning to the infrastructure of FIG. 1, communication system 100 in accordance with an embodiment is shown. Generally, communication system 100 can be implemented in any type or topology of networks. First network 104 and second network 110 each represent a series of points or nodes of interconnected communication paths for receiving and transmitting packets of information that propagate through communication system 100. These networks offer a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

A packet is a unit of data that can be routed between a source node and a destination node on a packet switched network, such as first network 104 and/or second network 110. A packet includes a source network address and a destination network address. These network addresses can be Internet Protocol (IP) addresses in a TCP/IP messaging protocol. The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, first client device 102, secure element 106, second client device 112, and third party computing device 114 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of first client device 102, secure element 106, second client device 112, and third party computing device 114 can include memory elements for storing information to be used in the operations outlined herein. Each of first client device 102, secure element 106, second client device 112, and third party computing device 114 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as first client device 102, secure element 106, second client device 112, and third party computing device 114, may include software modules to achieve, or to foster, operations as outlined herein. These modules may be suitably combined in any appropriate manner, which may be based on particular configuration and/or provisioning needs. In certain embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of first client device 102, secure element 106, second client device 112, and third party computing device 114 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Figure 2:
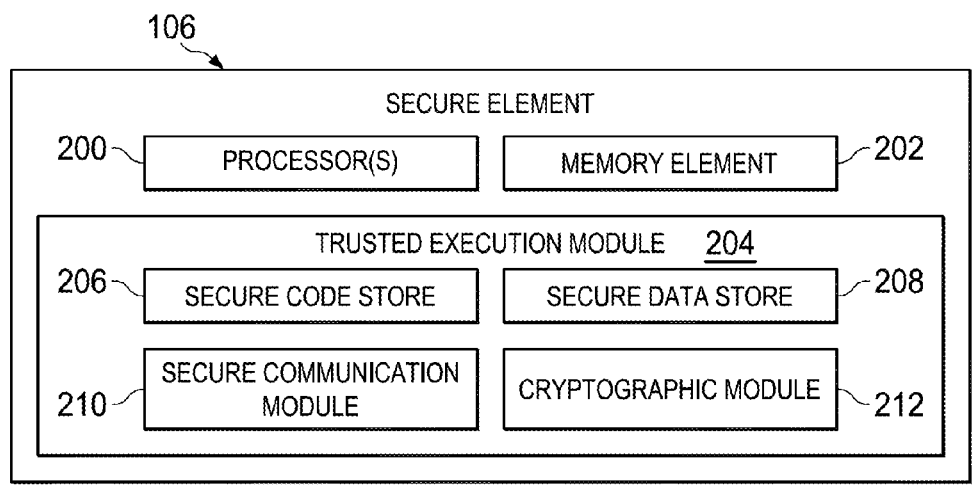
FIG. 2 is a simplified block diagram of an embodiment of the secure element of FIG. 1.

Referring now to FIG. 2, FIG. 2 is a simplified block diagram of an embodiment of secure element 106 of FIG. 1. Secure element 106 includes processor(s) 200, a memory element 202, and a trusted execution module 204. Trusted execution module 204 further includes a secure code store 206, a secure data store 208, a secure communication module 210, and a cryptographic module 212. Processor(s) 200 is configured to execute software instructions to perform various operations of secure element 106 as described herein. Memory element 202 may be configured to store software instructions and data associated with secure element 106. Processor(s) 200 may be any type of processor, such as a micro-processor, an embedded processor, a digital signal processor (DSP), a network processor, or other device to execute code. Although only one processor(s) 200 is illustrated in FIG. 2, it should be understood that secure element 106 may include more than one processor in some embodiments.

Secure code store 206 is configured to store code configured to execute the mutually agreed upon algorithms or procedures to process the sensitive data received from each of the distrusting parties. The term 'code' may refer to any software instructions, logic, source or object code, processor instructions, scripts, applications, algorithms, software procedures, or any other suitable code. In various embodiments, secure element 106 receives the code from one or more of first client device 102 and second client device 112 and stores the code within secure code store 206. Secure data store 208 is configured to store confidential data or information received from one or more of first client device 102 and second client device 112 for processing using the mutually agreed upon code stored within secure code store 206 when executed by processor(s) 200.

Secure communication module 210 is configured to facilitate secure communication between secure element 106 and other network elements such as first client device 102 and second client device 112. In one or more embodiments, secure communication module 210 is configured to facilitate remote attestation with first client device 102 and second client device 112, establish a secure connection with first client device 102 and second client device 112, receive confidential data or information from first client device 102 and second client device 112, and/or send a result of processing the confidential data to one or more of first client device 102, second client device 112, and third party computing device 114 as further described herein.

Cryptographic module 212 is configured to perform cryptographic operations upon information or data received from first client device 102 and second client device 112. In a particular embodiment, cryptographic module 212 is configured to verify that trusted execution module 204 is executing the secured code mutually agreed upon by first client device 102 and second client device 112 by computing a cryptographic identity, such as a cryptographic hash, of the secure code and sending the cryptographic identity to first client device 102 and second client device 112 for verification.

Figure 3:
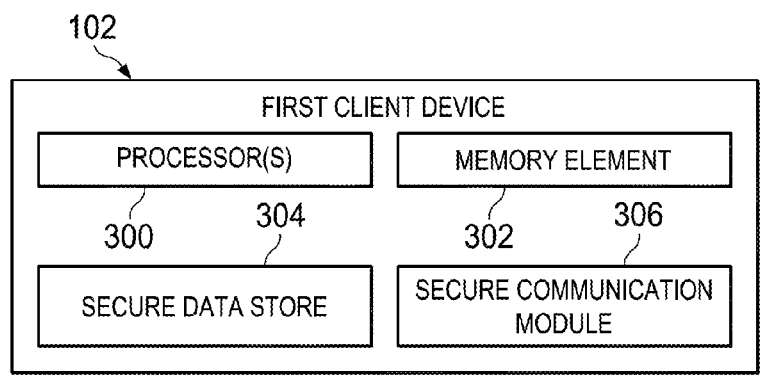
FIG. 3 is a simplified block diagram of an embodiment of the first client device of FIG. 1.

Referring now to FIG. 3, FIG. 3 is a simplified block diagram of an embodiment of first client device 102 of FIG. 1. First client device 102 includes processor(s) 300, a memory element 302, a secure data store 304, and a secure communication module 306. Processor(s) 300 is configured to execute software instructions to perform various operations of first client device 102 as described herein. Memory element 302 may be configured to store software instructions and data associated with first client device 102. Processor(s) 300 may be any type of processor, such as a micro-processor, an embedded processor, a digital signal processor (DSP), a network processor, or other device to execute code. Although only one processor(s) 300 is illustrated in FIG. 3, it should be understood that first client device 102 may include more than one processor in some embodiments.

Secure data store 304 is configured to store confidential data associated with first client device 102. For example, the confidential data may include a terrorist watch list if first client device 102 is associated with the DHS, and the confidential data may include a passenger manifest if first client device 102 is associated with an airline.

Secure communication module 306 is configured to facilitate secure communication between first client device 102 and secure element 106. In one or more embodiments, secure communication module 306 is configured to facilitate remote attestation with secure element 106, establish a secure connection with secure element 106, and send confidential data or information to secure element 106 for mutually agreed upon sharing with another entity, and/or receiving a result of the processing of the confidential data or information from secure element 106 as further described herein. In some embodiments, second client device 112 may be configured in a similar or the same manner as first client device 102 as illustrated in FIG. 3.

Figure 4A:
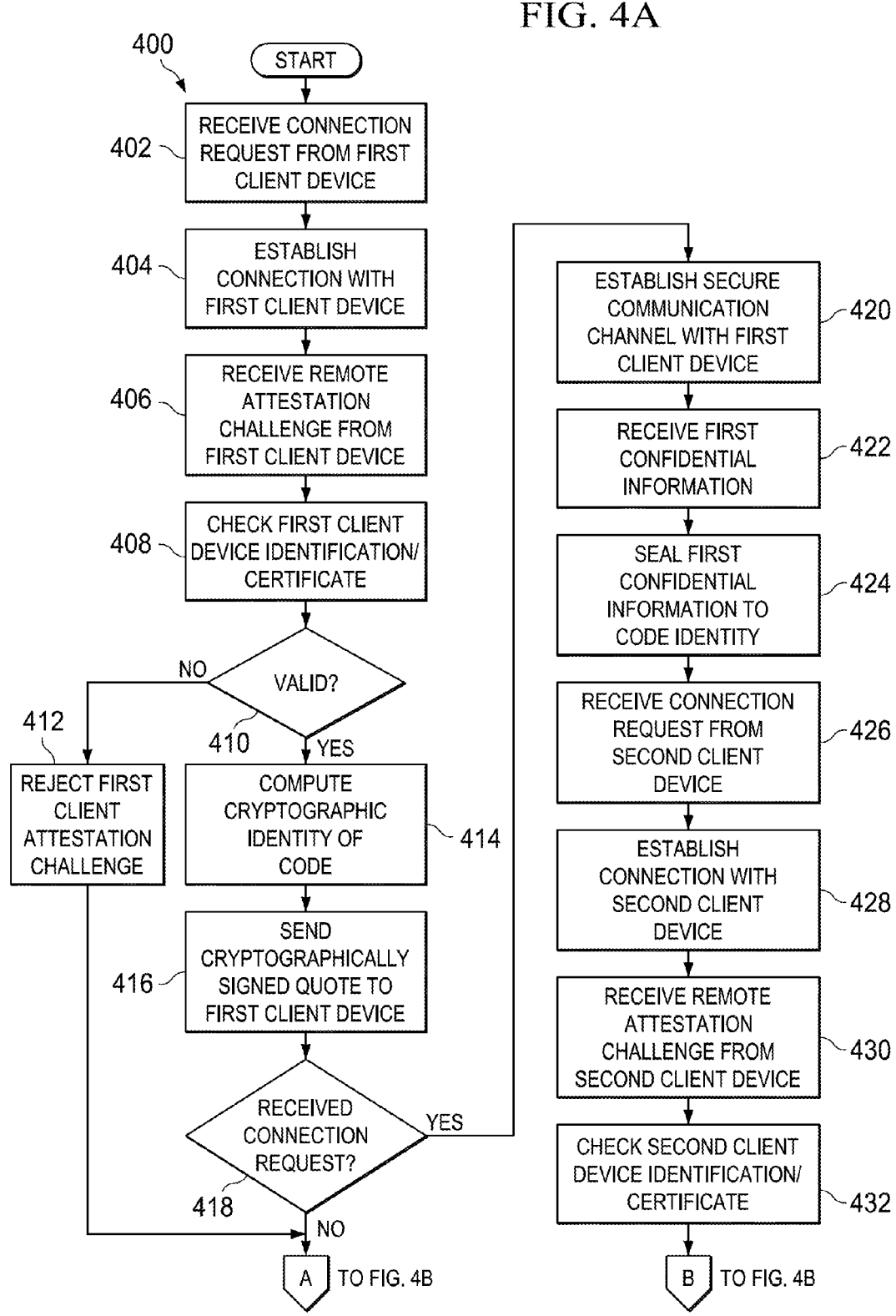
FIGS. 4A-4B are a simplified flowchart illustrating potential operations that may be associated with secure element of the communication system in accordance with an embodiment.
Figure 4B:
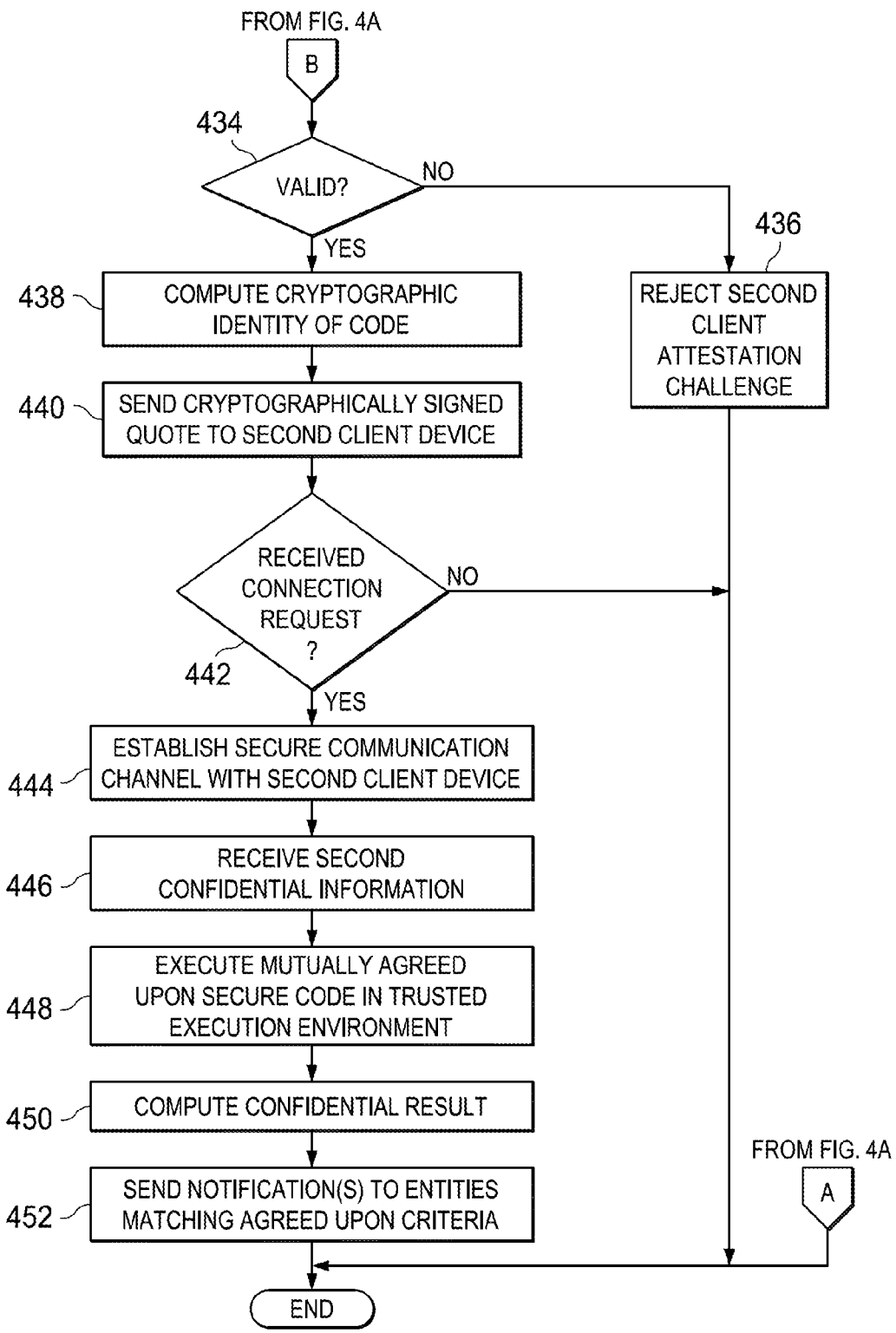

FIGS. 4A-4B are a simplified flowchart 400 illustrating potential operations that may be associated with secure element 106 of communication system 100 in accordance with an embodiment. In one or more embodiments, owners of confidential information, such as the first entity and the second entity, agree on security properties of secure element 106, a code identity that implements an algorithm to handle confidential data, and criteria for releasing a computed result. This may include privacy preservation requirements of the input confidential data in a computed result such as which entities to which the data may be provided and how much of the data may be provided. In 402, secure element 106 receives a connection request from first client device 102. In 404, secure element 106 establishes a connection with first client device 102. In a particular embodiment, the connection between secure element 106 and first client device 102 is a secure connection. In 406, secure element 106 receives a remote attestation challenge from first client device 102. In various embodiments, the remote attestation challenge includes a first client device identifier or certificate associated with first client device 102. Remote attestation allows changes to the trusted execution environment of secure element 106 to be detected by authorized parties such as first client device 102 and second client device 112. In one or more embodiments, first client device 102 and second client device 112 may authenticate the identity of the trusted execution environment including both hardware and code before releasing data to it using attestation and verification. For example, first client device 102 can use remote attestation to identify if unauthorized changes have been made to the mutually agreed upon secure code, including a user tampering with the secure code to circumvent technological protection measures or to modify the rules or procedures that the secure code uses to determine which confidential data is to be shared between the mutually distrusting entities. Remote attestation provides for the ability of two parties to remotely verify that the trusted execution environment provide by secure element 106 is the proper agreed upon environment and that they can safely provision their algorithms and secret/confidential information into this environment to perform the agreed upon actions. In a particular embodiment, hardware and/or software of secure element 106 generates a certificate or other cryptographic identity of the secure code in response to the remote attestation challenge and provides the certificate to first client device 102 to indicate that the unaltered secure code is currently executing.

In 408, secure element 106 checks the first client device ID/certificate to determine if the remote attestation challenge contains a proper identifier for first client device 102. In 410, secure element 106 determines whether the first client device ID/certificate is valid. If the first client device ID/certificate is not valid, the operations continue to 412 in which the first client device remote attestation challenge is rejected and the operations end. If the first client device ID/certificate is valid, the operations continue to 414 in which secure element 106 computes a cryptographic identity of the code stored within secure code store 206. In one or more embodiments, the secure code may be previously provided to secure element 106 by first client device 102 and/or second client device 112. In a particular embodiment, secure element 106 computes a cryptographic hash of the secure code. In still other embodiments, secure element 106 may compute any suitable cryptographic function upon the secure code. In still other embodiments, secure element 106 may determine any suitable identifier for the secure code. In 416, secure element 106 sends a cryptographically signed quote including the cryptographic identity to first client device 102. First client device 102 may receive the cryptographically signed quote and verify the signature in the cryptographically signed quote to ensure the secure code is signed by trusted hardware and/or software using the cryptographic identity. First client device 102 may further verify that the code identity conforms with its policies. If first client device 102 verifies the secure code, it sends a connection request to secure element 106 including an indication that the cryptographic identity has been verified by first client device 102. If first client device 102 fails to verify the secure code, it may not send a connection request to secure element 106.

In 418, secure element 106 receives the connection request from first client device 102. In 420, secure element 106 establishes a secure communication channel with first client device 102. In 422, secure element 106 receives first confidential information from first client device 102 using the secure channel. In a particular embodiment, the secure channel is a cryptographically protected channel between first client device 102 and the trusted execution environment of secure element 106 such that confidential information provided by first client device 102 may only be read by the trusted execution environment. The first confidential information includes portions of information that may be potentially shared with second client device 112. In a particular example, the first confidential information may include a terrorist watch list provided by the DHS. In 424, secure element 106 seals the confidential information to the code identity of the trusted network environment by storing the first confidential information within secure data store 208 in a way such that only the trusted execution environment running the same code that received the confidential information can read it. Accordingly, secure element 106 is provisioned with the first confidential information associated with first client device 102.

In 426, secure element 106 receives a connection request from second client device 112. In 428, secure element 106 establishes a connection with second client device 112. In a particular embodiment, the connection between secure element 106 and second client device 112 may be a secure connection. In 430, secure element 106 receives a remote attestation challenge from second client device 112. In various embodiments, the remote attestation challenge includes a second client device identifier or certificate associated with second client device 112. In 432, secure element 106 checks the second client device ID/certificate to determine if the remote attestation challenge contains a proper identifier for second client device 112. In 434, secure element 106 determines whether the second client device ID/certificate is valid. If the second client device ID/certificate is not valid, the operations continue to 436 in which the second client device remote attestation challenge is rejected and the operations end. If the second client device ID/certificate is valid, the operations continue to 438 in which secure element 106 computes a cryptographic identity of the code stored within secure code store 206. In a particular embodiment, secure element 106 computes a cryptographic hash of the secure code. In still other embodiments, secure element 106 may compute any suitable cryptographic function upon the secure code. In 440, secure element 106 sends a cryptographically signed quote including the cryptographic identity to second client device 112. Second client device 112 may receive the cryptographically signed quote and verify the secure code using the cryptographic identity. If second client device 112 verifies the secure code, it sends a connection request to secure element 106 including an indication that the cryptographic identity has been verified by second client device 112.

In 442, secure element 106 determines whether it has received a connection request from second client device 102. If secure element 106 does not receive the connection request the operations end. If secure element 106 does receive the connection request from second client device 112, in 444 secure element 106 establishes a secure communication channel with second client device 112. In a particular embodiment, the secure channel is a cryptographically protected channel between second client device 112 and the trusted execution environment of secure element 106 such that confidential information provided by second client device 112 may only be read by the trusted execution environment. In 446, secure element 106 receives second confidential information from second client device 112 and stores the second confidential information in secure data store 208. The second confidential information includes portions of confidential information that may be potentially shared with first client device 102. In a particular example, the second confidential information may include a passenger manifest provided by an airline.

In 448, secure element 106 executes the mutually agreed upon secure code in the trusted network environment. In 450, secure element 106 uses the secure code to compute a confidential result based upon the first confidential information and the second confidential information. In various embodiments, the secure code may be configured to perform aggregation, combination, or other processing of the first confidential information and the second confidential information to determine portions of the first confidential information and/or the second confidential information that should be shared with one or both of first client device 102 and second client device 112.

In at least one embodiment, the secure code functions to determine if portions of data or information included in the first confidential information matches portions of data included in the second confidential information. In particular embodiments, secure element 106 determines whether a match has been found between one or more items or portions of information in the first confidential data and one or more items or portions of information in the second confidential data.

In 452, secure element 106 sends one or more notification to one or more entities matching criteria agreed upon the participants such as one or more owners of provided confidential information such as the first entity and/or the second entity. In various embodiments, the criteria may include criteria for releasing the computed result including who can receive the computer result, how the result consumer's identity is validated, and/or confidentiality requirements.

In one or more embodiments, the criteria may include sending one or more notifications indicating that no matches have been found to one or more of first client device 102, second client device 112, or third party computing device 114 if it is determined that no matches have been found. In still other embodiments, the criteria may include sending one or more notifications indicating that a match has been found to one or more of first client device 102, second client device 112, or third party computing device 114 if it is determined that a match as been found. In one or more embodiments, the notification may includes at least a portion of matching confidential information. For example, in a particular embodiment, the matching confidential information may include one or more persons from a terrorist watch list that match one or more persons in a passenger manifest. The operations may then end.

Figure 5:
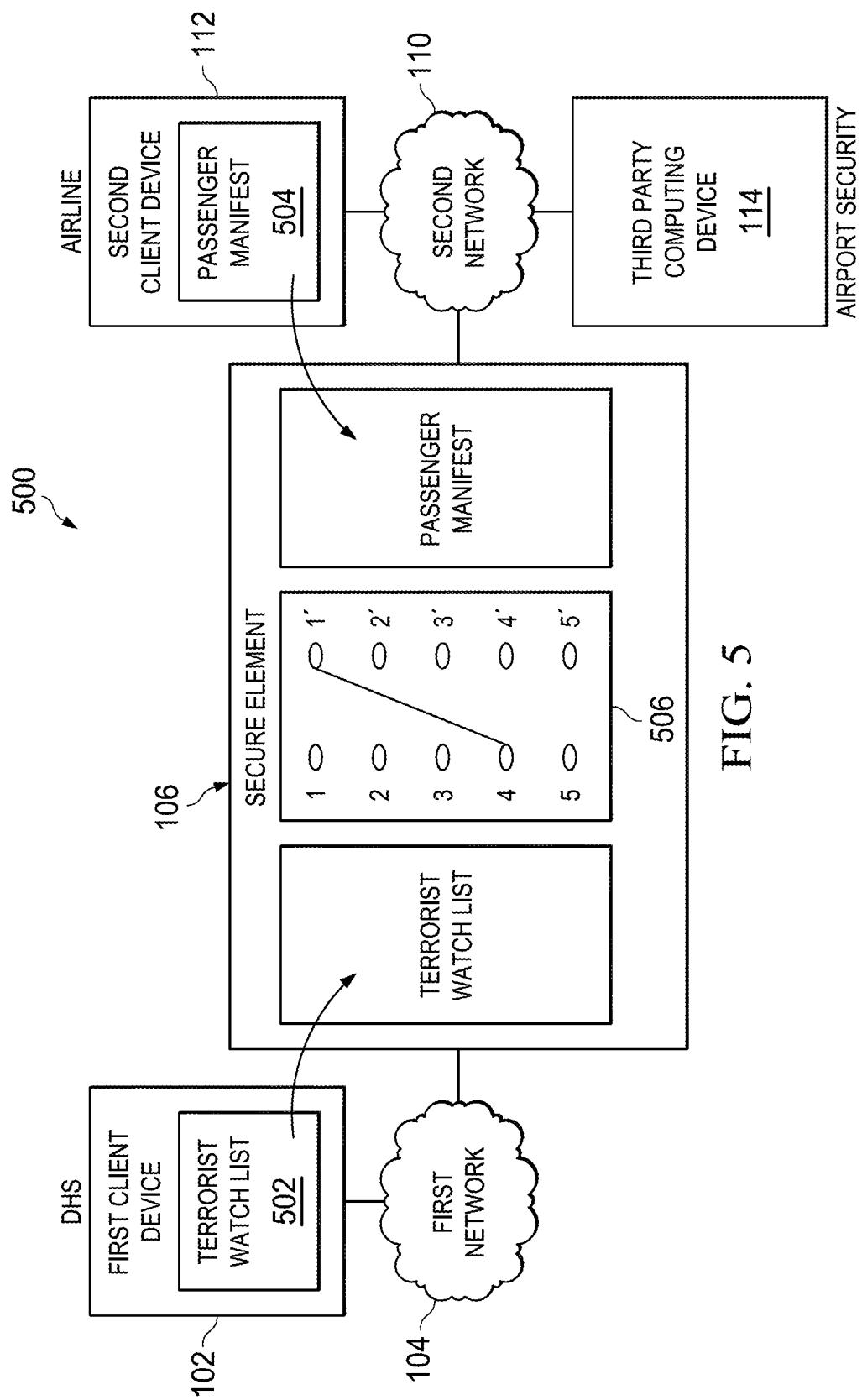
FIG. 5 is a simplified block diagram of a communication system for mutually assured data sharing between distrusting parties in a network environment in accordance with another embodiment of the present disclosure.

FIG. 5 is a simplified block diagram of a communication system 500 for mutually assured data sharing between distrusting parties in a network environment in accordance with another embodiment of the present disclosure. In the particular embodiment illustrated in FIG. 5, first client device 102 is associated with the Department of Homeland Security (DHS). The DHS maintains a terrorist watch list 502 including identifying information of one or more persons suspected of engaging in terrorist activity. First client device 102 is configure to provide terrorist watch list 502 to secure element 106. Second client device 112 is associated with an airline. The airline generates a passenger manifest 504 including indentifying information of one or more persons who are scheduled as passengers for a particular flight. Second client device 112 is configured to provide passenger manifest 502 to secure element 106 prior to takeoff of the flight. Secure element 106 includes secure code 506 that is mutually agreed upon by both the DHS and the airline for determining which portions of one or more of terrorist watch list 502 and passenger manifest 504 are to be shared between first client device 102 and second client device 112.

Secure element 106 is configured to process terrorist watch list 502 and passenger manifest 504 to determine if there are any matching entries. Any matching entries can then be provided to one or more of the DHS via first client device 102 and the airline via second client device 504. In this way, the DHS and the airline may be alerted that a suspected terrorist is attempting to board the flight and further action can be taken by the DHS or the airline. Third party computing device 114 may be further associated with airport security at the location of the flight. Secure element 106 may be further configured to provide the matching entries to airport security via third party computing device 114 so that airport security can take further action such as preventing the suspected terrorist from boarding the flight and/or arresting the suspected terrorist. Further operations of the communication system 500 of FIG. 5 are further described with respect to FIGS. 6A-6B below.

Figure 6A:
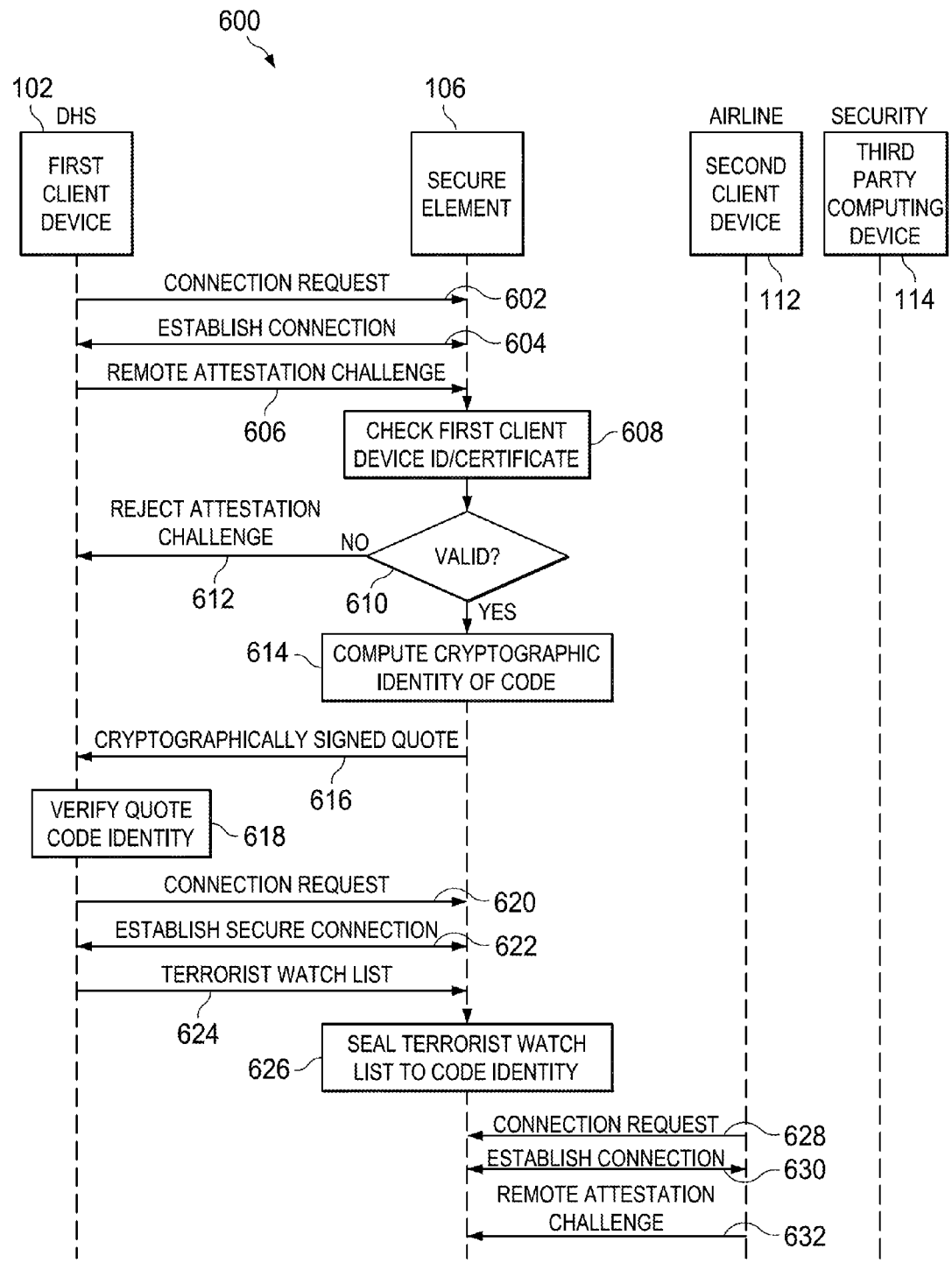
FIGS. 6A-6B are a simplified interaction diagram illustrating potential operations that may be associated with first client device, secure element, second client device, and third client device in accordance with a particular embodiment.
Figure 6B:
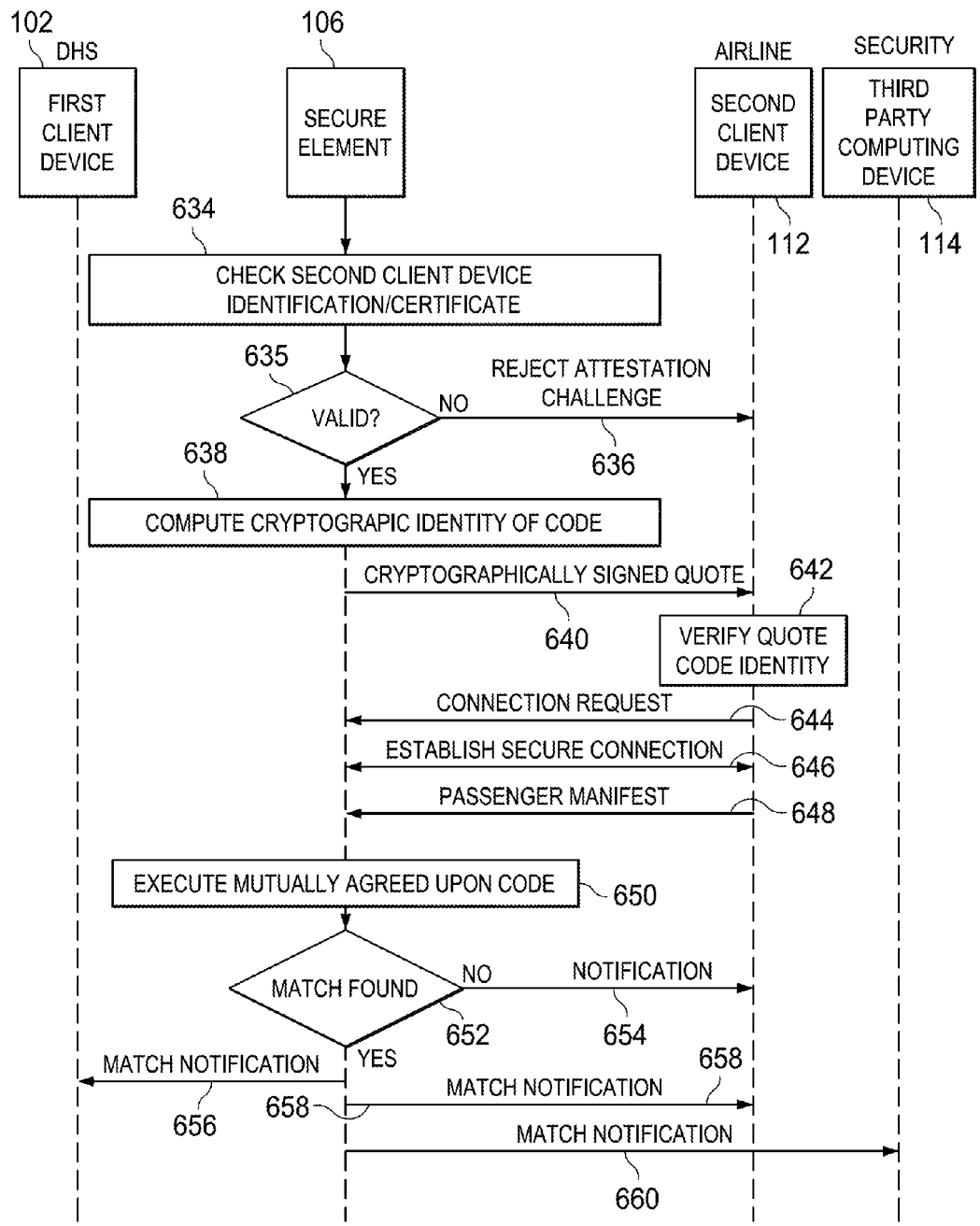

FIGS. 6A-6B are a simplified interaction diagram 600 illustrating potential operations that may be associated with first client device 102, secure element 106, second client device 112, and third party computing device 114 in accordance with a particular embodiment. In 602, first client device 102 begins a DHS terrorist watch list provisioning procedure and sends a connection request to secure element 106. In 604, secure element 106 establishes a connection with first client device 102. In a particular embodiment, the connection between secure element 106 and first client device 102 may be a secure connection. In 606, first client device 102 sends a remote attestation challenge to secure element 106. In various embodiments, the remote attestation challenge includes a first client device identifier or certificate associated with first client device 102.

In 608, secure element 106 checks the first client device ID/certificate to determine if the remote attestation challenge contains a proper identifier for first client device 102. In 610, secure element 106 determines whether the first client device ID/certificate is valid. If the first client device ID/certificate is not valid, the operations continue to 612 in which secure element 106 rejects the first client device remote attestation challenge and the operations end. If the first client device ID/certificate is valid, the operations continue to 614 in which secured network element 106 computes a cryptographic identity of the secure code stored within secure code store 206. In one or more embodiments, the secure code may be previously provided to secure element 106 by first client device 102 and/or second client device 112. In a particular embodiment, secure element 106 computes a cryptographic hash of the secure code. In still other embodiments, secure element 106 may compute any suitable cryptographic function or other identity generating computation upon the secure code. In 616, secure element 106 sends a cryptographically signed quote including the cryptographic identity to first client device 102. In 618, first client device 102 receives the cryptographically signed quote and verifies the secure code using the crypto-graphic identity. In 620, first client device 102 sends a connection request to secure element 106.

In 622, secure element 106 establishes a secure connection with first client device 102 after receiving the connection request. In 624, first client device 102 sends terrorist watch list 502 to secure element 106. In 626, secure element 106 seals the terrorist watch list 502 to the code identity of the trusted network environment. Accordingly, secure element 106 is provisioned with terrorist watch list 502 associated with first client device 102.

In 628, before flight take-off second client device 112 sends a connection request to secure element 106. In 630, secure element 106 establishes a connection with second client device 112. In a particular embodiment, the connection between secure element 106 and second client device 112 may be a secure connection. In 632, second client device 112 sends a remote attestation challenge to secure element 106. In various embodiments, the remote attestation challenge includes a second client device identifier or certificate associated with second client device 112. In 634, secure element 106 checks the second client device ID/certificate to determine if the remote attestation challenge contains a proper identifier for second client device 112. In 635, secure element 106 determines whether the second client device ID/certificate is valid. If the second client device ID/certificate is not valid, the operations continue to 636 in which the second client device remote attestation challenge is rejected and the operations end. If the second client device ID/certificate is valid, the operations continue to 638 in which secure element 106 computes a cryptographic identity of the secure code 506 stored within secure code store 206. In a particular embodiment, secure element 106 computes a cryptographic hash of the secure code. In still other embodiments, secure element 106 may compute any suitable cryptographic function upon the secure code 506. In 640, secure element 106 sends a cryptographically signed quote including the cryptographic identity to second client device 112. In 642, second client device 112 receives the cryptographically signed quote and verifies the secure code 506 using the cryptographic identity. In 644, second client device 112 sends a connection request to secure element 106.

In 646, secure element 106 establishes a secure connection with second client device 112. In 648, second client device 112 sends the passenger manifest 504 to secure element 106 and secure element 106 stores passenger manifest 504 in secure data store 208.

In 650, secure element 106 executes the mutually agreed upon secure code 506 in the trusted network environment. In at least one embodiment, secure code 502 functions to determine if identifying information associated with a person in terrorist watch list 502 matches identifying information associated with a passenger found in passenger manifest 504.

In 652, secure element 106 determines whether a match has been found between one or more items or portions of terrorist watch list 502 and passenger manifest 504. If no match is found, the operations continue to 654 in which secure element 106 sends one or more notifications to second client device 112 indicating that no matches have been found, and after 654 the operations end. In a particular embodiment, secure element 106 may further send the notification that no matches have been found to one or more of first client device 102 and third party computing device 114.

If a match is found in 652, the operations continue to 656. In 656, secure element 106 sends a notification indicating that a match has been found to first client device 102. In 658, secure element 106 sends a notification indicating that a match has been found to second client device 112. In 660, secure element 106 sends a notification indicating that a match has been found to third party computing device 114. In one or more embodiments, the notification includes identifying information of a person matching in terrorist watch list 502 and passenger manifest 504. Accordingly, the DHS, the airline and airport security may be notified in the case of a positive identification of a suspected terrorist. The operations may then end.

While particular example have been described in terms of national security with respect to airline travel, it should be understood that the principles described herein are applicable to any situation, including government and commercial applications such as financial and medical, in which different parties have an interest in combining and aggregating shared sensitive data but wish to keep individual sensitive data secret, private or confidential. One area in which the principles described herein may be utilized includes scenarios in which confidential aggregation of sensitive information from different government agencies can provide a wider view of a threat, but these agencies may hesitate to share information due to a lack of sufficient trust regarding how the sensitive data will be utilized and protected. For example, the Federal Bureau of Investigation (FBI) may maintain a fingerprint database to which the Central Intelligence Agency (CIA) may wish to have access. Trusted broker service 108 may provide the functions of secure element 106 so that the FBI fingerprint database is provisioned within secure element 106 and a CIA agent provides fingerprint information associated with a particular fingerprint. If a match of the fingerprint information is found by secure element 106 by executing mutually agreed upon secure code, the CIA agent may be provided with a name and other details associated with the matching fingerprint record.

In another example, the principles described herein may be applied in financial industries for purposes such as uncovering fraudulent transfers or money laundering in which an auditor often needs a unified view across different banking databases. For example, a financial institution may not wish to provide customer information regarding all of its customers to a central authority. Instead the financial institution may provide customer transaction data to secure element 106, and secure element 106 may execute secure code to identify only customers matching a fraudulent transfer profile, and provide information regarding only the matching customers to the central authority.

In another example, a patient may visit a medical doctor and the doctor may wish to prescribe a particular drug for which there could be interactions with other drugs the patient might be taking. In such a situation, secure element 106 may be provided with information regarding drug interactions from a pharmaceutical company and the identity of the drug that the doctor wishes to prescribe may be provided by the doctor. Drug interaction effects may be computed using secure element 106 and provided to the doctor without providing private information regarding the drugs the patient is currently taking to the pharmaceutical company.

In another embodiment, a one or more entities may perform a joint computation of their combined confidential data. In still another embodiment, a first entity may perform a confidential query on private data of a second entity in a manner in which the second entity does not know what information was queried for by the first entity, and the first entity does not know what data resulted from the query. In still another embodiment, the first entity may perform a confidential query on aggregated private data sets of a second entity and a third entity in a manner in which the second entity and the third entity do not know what information was queried for by the first entity and the first entity, the second entity, and the third entity do not know what total data resulted from the query. In still another embodiment, a first entity may perform a non-confidential query on aggregated private data of a second entity and a third entity in a manner in which the second entity and the third entity do not know what information was queried for by the first entity and the first entity, the second entity, and the third entity do not know what total data resulted from the query. In still another embodiment, the first entity may provide a secret code and confidential data to execute in a trusted execution environment on a second entity's confidential data in which the results are consumed by the second entity only.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures. For example, in particular embodiments, more than two entities may share portions of their respective confidential information. In addition, although various embodiments illustrated secure element 106 being located with a trust broker service 108, it should be understood that in other embodiments, secure element 106 may be located in one or more of first client device 102, second client device 112, third party computing device 114, or any other suitable location within communication network 100.

It is also important to note that the operations in the preceding flow diagrams illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100.

An advantage of one or more embodiments include providing a secure environment for providing sharing confidential or private data between entities with hardware and/or software enforced confidentiality, integrity, and/or remote attestation. Another advantage of one or more embodiments is that it may provide assurance that private or confidential data will be utilized only for the purpose of achieving a shared goal and will not be misused by either entity or leaked to outside entities. Another advantage of one or more embodiments is that it may provide the ability to scale dynamically as data sharing needs evolve. Still another advantage of one or more embodiments is that it may provide the ability to deliver on a shared goal to the entities in a cost-effective and timely fashion.

The following examples pertain to further embodiments.

Example 1 is apparatus for sharing information between entities includes a processor and a trusted execution module executing on the processor. The trusted execution module is configured to receive first confidential information from a first client device associated with a first entity, seal the first confidential information within a trusted execution environment, receive second confidential information from a second client device associated with a second entity, seal the second confidential information within the trusted execution environment, and execute code within the trusted execution environment. The code is configured to compute a confidential result based upon the first confidential information and the second confidential information.

In Example 2, the subject matter of Example 1 can optionally include that the trusted execution module is further configured to receive the code from at least one of the first client device and the second client device, and seal the code within the trusted execution environment.

In Example 3, the subject matter of Example 1 can optionally include that the trusted execution module is further configured to determine an identity of the code, send the identity to the first client device, and receive an indication from the first device that the identity has been verified by the first client device.

In Example 4, the subject matter of Example 3 can optionally include that the identity is a cryptographically signed identity computed within the trusted execution environment.

In Example 5, the subject matter of Example 1 can optionally include that the first confidential information is confidential to the first entity and the second confidential information is confidential to the second entity.

In Example 6, the subject matter of Example 1 can optionally include that the trusted execution module is further configured to send a notification to one or more entities matching criteria agreed upon by the first entity and the second entity.

In Example 7, the subject matter of Example 6 can optionally include that the notification includes the confidential result.

In Example 8, the subject matter of Example 1 can optionally include that computing a confidential result based upon the first confidential information and the second confidential information includes determining if a first portion of the first confidential information matches a second portion of the second confidential information.

In Example 9, the subject matter of Example 9 can optionally include that the trusted execution module is further configured to send a notification to at least one of the first client device and the second client device when the first portion matches the second portion.

In Example 10, the subject matter of Example 9 can optionally include that the notification includes at least a portion of the matching information.

In Example 11, the subject matter of Example 1 can optionally include that the code is mutually agreed upon by the first entity and the second entity.

Example 12 is at least one machine readable storage medium having instructions stored thereon for sharing information between entities. the instructions when executed by a processor cause the processor to receive first confidential information from a first client device associated with a first entity, seal the first confidential information within a trusted execution environment, receive second confidential information from a second client device associated with a second entity, seal the second confidential information within the trusted execution environment, and execute code within the trusted execution environment. The code is configured to compute a confidential result based upon the first confidential information and the second confidential information.

In Example 13, the subject matter of Example 12 can optionally include instructions that when executed by the processor cause the processor to receive the code from at least one of the first client device and the second client device, and seal the code within the trusted execution environment.

In Example 14, the subject matter of Example 12 can optionally include instructions that when executed by the processor cause the processor to determine an identity of the code, send the identity to the first client device, and receive an indication from the first device that the identity has been verified by the first client device.

In Example 15, the subject matter of Example 14 can optionally include that the identity is a cryptographically signed identity computed within the trusted execution environment.

In Example 16, the subject matter of Example 12 can optionally include that the first confidential information is confidential to the first entity and the second confidential information is confidential to the second entity.

In Example 17, the subject matter of Example 12 can optionally include that the trusted execution module is further configured to send a notification to one or more entities matching criteria agreed upon by the first entity and the second entity.

In Example 18, the subject matter of Example 12 can optionally include that the notification includes the confidential result.

In Example 19, the subject matter of Example 12 can optionally include that computing a confidential result based upon the first confidential information and the second confidential information includes determining if a first portion of the first confidential information matches a second portion of the second confidential information.

In Example 20, the subject matter of Example 12 can optionally include that the trusted execution module is further configured to send a notification to at least one of the first client device and the second client device when the first portion matches the second portion.

In Example 21, the subject matter of Example 20 can optionally include that the notification includes at least a portion of the matching information.

In Example 22, the subject matter of Example 12 can optionally include that the code is mutually agreed upon by the first entity and the second entity.

Example 23 is a method for sharing information between entities including receiving first confidential information from a first client device associated with a first entity, sealing the first confidential information within a trusted execution environment, receiving second confidential information from a second client device associated with a second entity, sealing the second confidential information within the trusted execution environment, and executing code within the trusted execution environment, the code configured to compute a confidential result based upon the first confidential information and the second confidential information.

In Example 24, the subject matter of Example 23 can optionally include receiving the code from at least one of the first client device and the second client device, and sealing the code within the trusted execution environment.

In Example 25, the subject matter of Example 23 can optionally include determining an identity of the code, sending the identity to the first client device, and receiving an indication from the first device that the identity has been verified by the first client device.

In Example 26, the subject matter of Example 23 can optionally include that the identity is a cryptographically signed identity computed within the trusted execution environment.

In Example 27, the subject matter of Example 23 can optionally include that the first confidential information is confidential to the first entity and the second confidential information is confidential to the second entity.

In Example 28, the subject matter of Example 23 can optionally include sending a notification to one or more entities matching criteria agreed upon by the first entity and the second entity.

In Example 29, the subject matter of Example 28 can optionally include that the notification includes the confidential result.

In Example 30, the subject matter of Example 23 can optionally include that computing a confidential result based upon the first confidential information and the second confidential information includes determining if a first portion of the first confidential information matches a second portion of the second confidential information.

In Example 31, the subject matter of Example 30 can optionally include sending a notification to at least one of the first client device and the second client device when the first portion matches the second portion.

In Example 32, the subject matter of Example 31 can optionally include that the notification includes at least a portion of the matching information.

In Example 33, the subject matter of Example 31 can optionally include that the code is mutually agreed upon by the first entity and the second entity.

Example 34 is a machine readable storage medium including instructions, that when executed, cause a machine to perform the method of any one of Examples 23-33.

Example 35 is an apparatus including a means for performing any one of the methods of Examples 23-33.

Example 36 is an apparatus for sharing information between entities including means for receiving first confidential information from a first client device associated with a first entity, means for sealing the first confidential information within a trusted execution environment, means for receiving second confidential information from a second client device associated with a second entity, means for sealing the second confidential information within the trusted execution environment, and means for executing code within the trusted execution environment. The code is configured to compute a confidential result based upon the first confidential information and the second confidential information.

What is claimed is:

1. An apparatus for sharing information between entities, comprising:
a processor; and
a trusted execution module executing on the processor, the trusted execution module configured to:
receive first confidential information from a first client device associated with a first entity;
seal the first confidential information within a trusted execution environment;
receive second confidential information from a second client device associated with a second entity;
seal the second confidential information within the trusted execution environment;
receive code from at least one of the first client device and the second client device;
seal the code within the trusted execution environment; and
execute the code within the trusted execution environment, the code configured to compute a confidential result based upon the first confidential information and the second confidential information.

2. The apparatus of claim 1, the trusted execution module being further configured to:
determine an identity of the code;
send the identity to the first client device; and
receive an indication from the first device that the identity has been verified by the first client device.

3. The apparatus of claim 2, wherein the identity is a cryptographically signed identity computed within the trusted execution environment.

4. The apparatus of claim 1, wherein the first confidential information is confidential to the first entity and the second confidential information is confidential to the second entity.

5. The apparatus of claim 1, wherein the trusted execution module is further configured to send a notification to one or more entities matching criteria agreed upon by the first entity and the second entity.

6. The apparatus of claim 5, wherein the notification includes the confidential result.

7. The apparatus of claim 1, wherein computing a confidential result based upon the first confidential information and the second confidential information includes determining if a first portion of the first confidential information matches a second portion of the second confidential information.

8. The apparatus of claim 7, wherein the trusted execution module is further configured to send a notification to at least one of the first client device and the second client device when the first portion matches the second portion.

9. The apparatus of claim 8, wherein the notification includes at least a portion of the matching first portion and second portion.

10. The apparatus of claim 1, wherein the code is mutually agreed upon by the first entity and the second entity.

11. At least one non-transitory machine readable storage medium having instructions stored thereon for sharing information between entities, the instructions when executed by a processor cause the processor to:
receive first confidential information from a first client device associated with a first entity;
seal the first confidential information within a trusted execution environment;
receive second confidential information from a second client device associated with a second entity;
seal the second confidential information within the trusted execution environment;

receive code from at least one of the first client device and the second client device;

seal the code within the trusted execution environment; and execute the code within the trusted execution environment, the code configured to compute a confidential result based upon the first confidential information and the second confidential information.

12. The at least one non-transitory machine readable storage medium of claim 11, comprising further instructions that when executed by the processor cause the processor to:

determine an identity of the code;

send the identity to the first client device; and receive an indication from the first device that the identity has been verified by the first client device.

13. The at least one non-transitory machine readable storage medium of claim 12, wherein the identity is a cryptographically signed identity computed within the trusted execution environment.

14. The at least one non-transitory machine readable storage medium of claim 11, wherein the first confidential information is confidential to the first entity and the second confidential information is confidential to the second entity.

15. The at least one non-transitory machine readable storage medium of claim 11, wherein the trusted execution module is further configured to send a notification to one or more entities matching criteria agreed upon by the first entity and the second entity.

16. The at least one non-transitory machine readable storage medium of claim 15, wherein the notification includes the confidential result.

17. The at least one non-transitory machine readable storage medium of claim 11, wherein computing a confidential result based upon the first confidential information and the second confidential information includes determining if a first portion of the first confidential information matches a second portion of the second confidential information.

18. The at least one non-transitory machine readable storage medium of claim 17, wherein the trusted execution module is further configured to send a notification to at least one of the first client device and the second client device when the first portion matches the second portion.

19. The at least one non-transitory machine readable storage medium of claim 18, wherein the notification includes at least a portion of the matching first portion and second portion.

20. The at least one non-transitory machine readable storage medium of claim 11, wherein the code is mutually agreed upon by the first entity and the second entity.

21. A method for sharing information between entities, comprising:

receiving first confidential information from a first client device associated with a first entity;

sealing the first confidential information within a trusted execution environment;

receiving second confidential information from a second client device associated with a second entity;

sealing the second confidential information within the trusted execution environment;

receiving code from at least one of the first client device and the second client device;

sealing the code within the trusted execution environment; and executing the code within the trusted execution environment, the code configured to compute a confidential result based upon the first confidential information and the second confidential information.

22. The method of claim 21, further comprising sending a notification to one or more entities matching criteria agreed upon by the first entity and the second entity.

* * * * *

UNITED STATES PATENT AND TRADEMARK OFFICE
CERTIFICATE OF CORRECTION

| | | |
|---|---|---|
| PATENT NO. | : 9,171,163 B2 | Page 1 of 1 |
| APPLICATION NO. | : 13/844101 | |
| DATED | : October 27, 2015 | |
| INVENTOR(S) | : Vinay Phegade et al. | |

It is certified that error appears in the above-identified patent and that said Letters Patent is hereby corrected as shown below:

Drawings

On sheet 6 of 6, in Figure 6B, Reference Numeral 638, line 1, delete "CRYPTOGRAPIC" and insert --CRYPTOGRAPHIC--, therefor.

Signed and Sealed this
Twenty-ninth Day of March, 2016

Michelle K. Lee
*Director of the United States Patent and Trademark Office*